March 29, 1938. C. FIELD 2,112,596
HEAT EXCHANGE APPARATUS
Original Filed Aug. 14, 1931 6 Sheets-Sheet 1
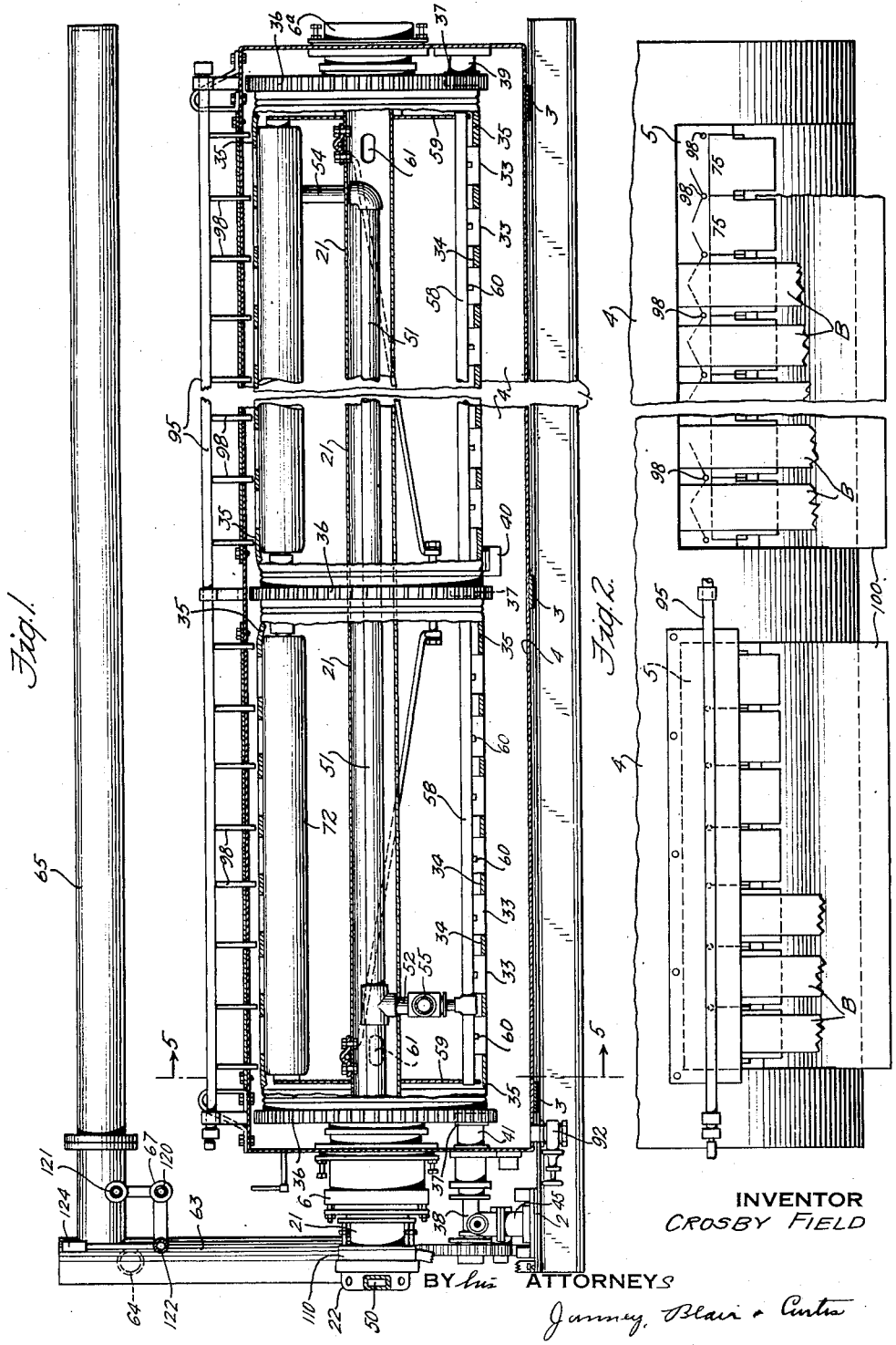
INVENTOR
CROSBY FIELD
BY his ATTORNEYS March 29, 1938.     C. FIELD     2,112,596
HEAT EXCHANGE APPARATUS
Original Filed Aug. 14, 1931     6 Sheets-Sheet 2
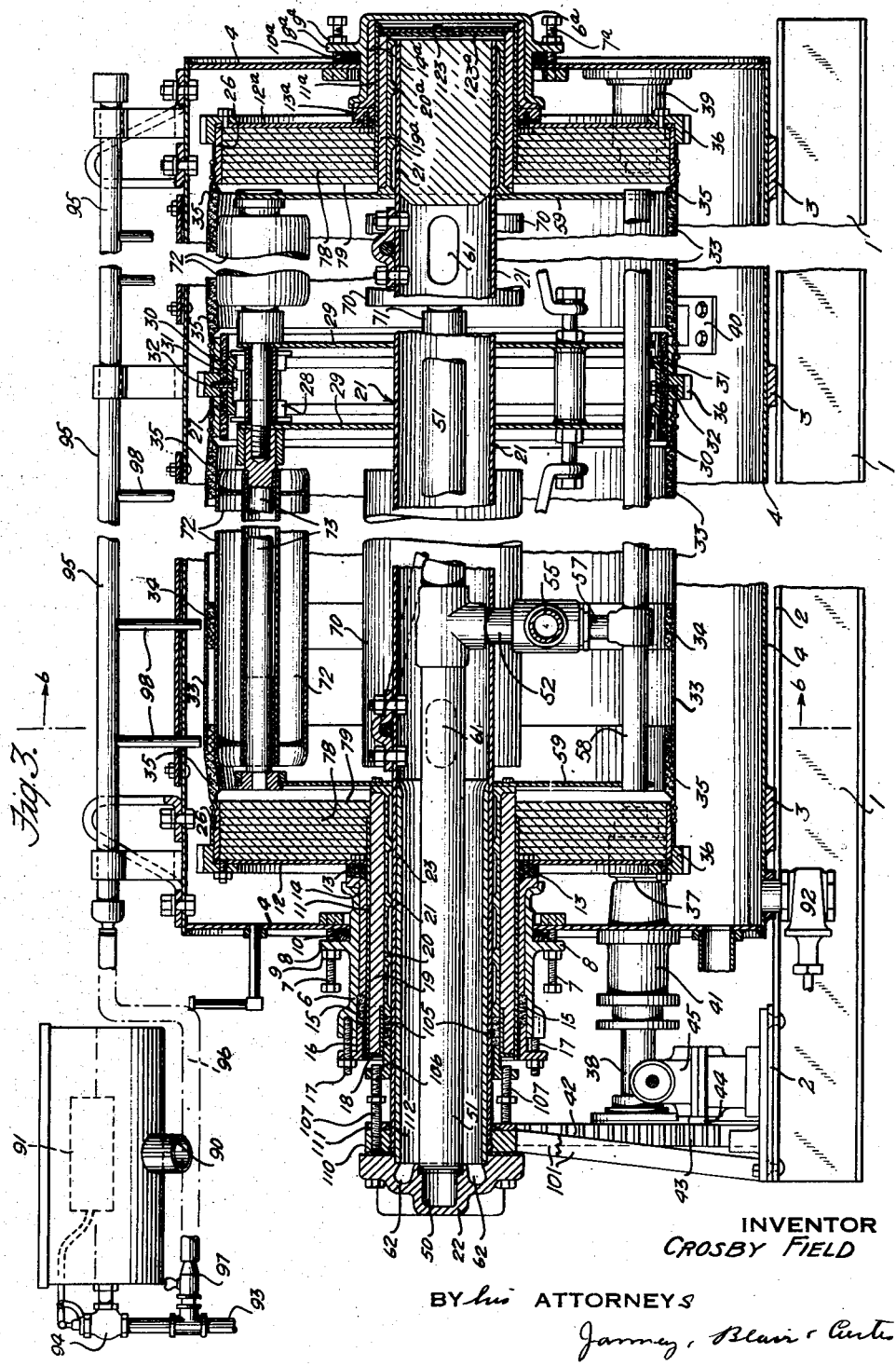
INVENTOR
CROSBY FIELD
BY his ATTORNEYS March 29, 1938.  C. FIELD  2,112,596
HEAT EXCHANGE APPARATUS
Original Filed Aug. 14, 1931   6 Sheets-Sheet 3

INVENTOR
CROSBY FIELD
BY his ATTORNEYS

March 29, 1938.　　　C. FIELD　　　2,112,596

HEAT EXCHANGE APPARATUS

Original Filed Aug. 14, 1931　　6 Sheets-Sheet 4

INVENTOR
CROSBY FIELD

BY ATTORNEYS

March 29, 1938.  C. FIELD  2,112,596
HEAT EXCHANGE APPARATUS
Original Filed Aug. 14, 1931   6 Sheets-Sheet 5

INVENTOR
CROSBY FIELD
BY his ATTORNEYS

March 29, 1938.  C. FIELD  2,112,596

HEAT EXCHANGE APPARATUS

Original Filed Aug. 14, 1931   6 Sheets-Sheet 6

INVENTOR
CROSBY FIELD
BY ATTORNEYS

Patented Mar. 29, 1938

2,112,596

UNITED STATES PATENT OFFICE 2,112,596

HEAT EXCHANGE APPARATUS

Crosby Field, Brooklyn, N. Y., assignor to Flakice Corporation, Wilmington, Del., a corporation of Delaware Application August 14, 1931, Serial No. 557,106
Renewed February 6, 1937

28 Claims. (Cl. 62—106)

This invention relates to heat exchange apparatus of the type in which a coating of brittle material is formed upon and subsequently removed from a deformable member through which the exchange of heat occurs for causing the brittle material to form thereon. In its present employment the invention relates more particularly to ice making apparatus wherein the ice is formed upon a thin flexible sheet, such as a cylinder, which is subsequently flexed to cause peeling of the ice therefrom. It is an object of the present invention to provide improved apparatus of this type which will be more particularly suitable for exacting commercial operating requirements.

The nature and further objects of the invention will be apparent to those skilled in the art from the following description and accompanying drawings of one illustrative embodiment of the invention.

In the drawings:

Fig. 1 is a side elevation partly in section of an assembled machine embodying the invention.

Fig. 2 is a partial plan view of the top of the assembly and showing the manner in which the strips of ice are peeled from the freezing cylinder.

Fig. 3 is an enlarged longitudinal central vertical section of the water tank and freezing cylinder.

The present apparatus in general comprises a thin flexible cylinder journaled for rotation within a vessel containing water maintained at a level slightly below the top of the cylinder. Brine or any other suitable refrigerating medium is circulated through the interior of the cylinder and forced in jets against its inner surface, causing ice to form very rapidly upon that part of its outer surface which is submerged in the water. The thin wall of the cylinder which extends above the water level is deflected by suitable mechanism to alter the normal radius of curvature of the cylinder at that point, and thereby cause the ice which is formed thereon during rotation of the cylinder in the water to peel from the cylinder above the water level in long sheets or ribbons which break off and pass down a chute into a suitable receptacle or storage bin.

Such a peeling of the ice above the water level permits the production of a drier and colder ice in long sheets or ribbons which may be passed directly from the cylinder to the storage bins, thus avoiding the necessity of recovering the ice from the water in the vessel and accelerating and reducing the cost of production.

Foundation and tank

Figure 4:
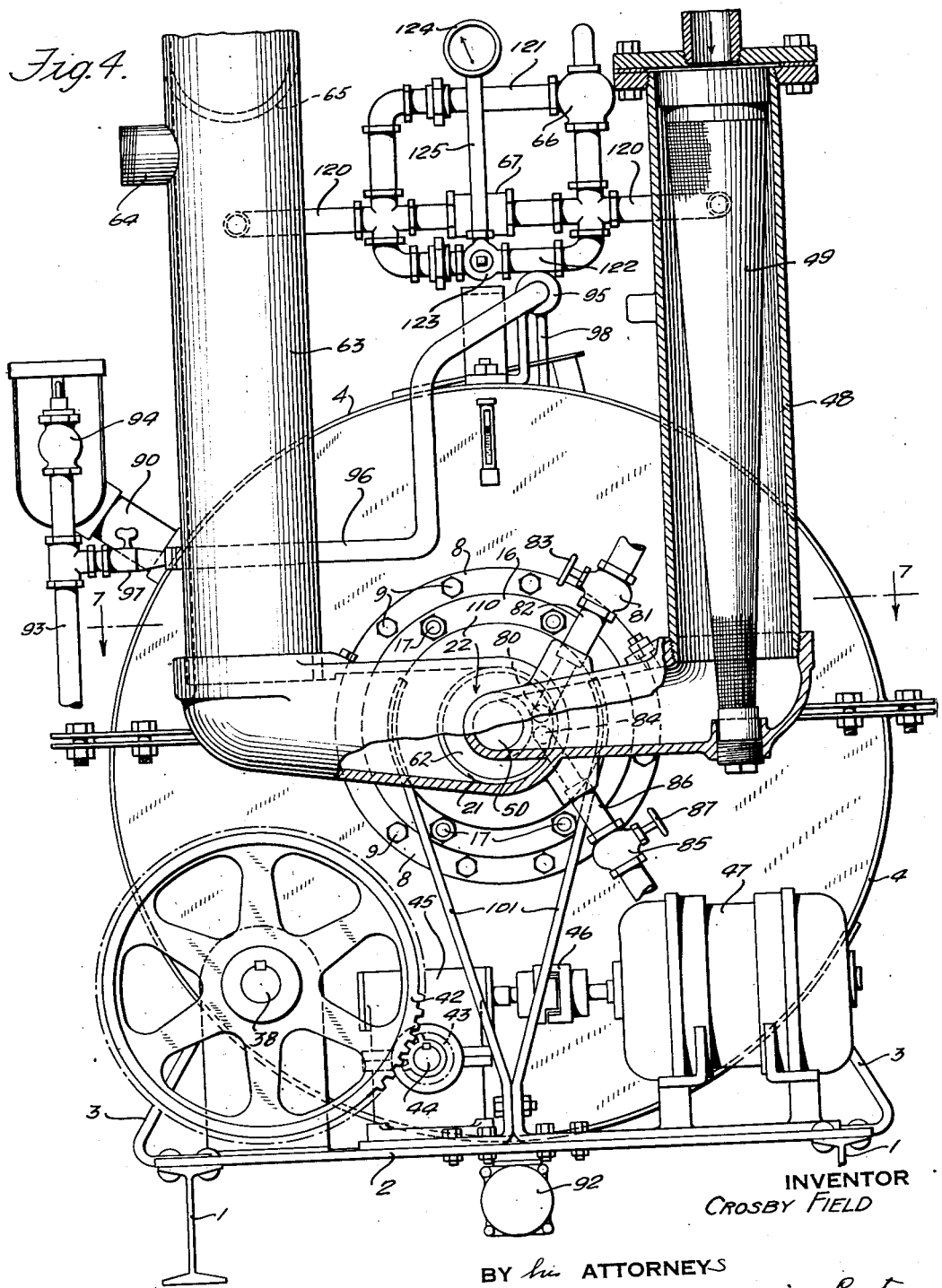
Fig. 4 is an enlarged end elevation seen from the left in Fig. 1.
Figure 5:
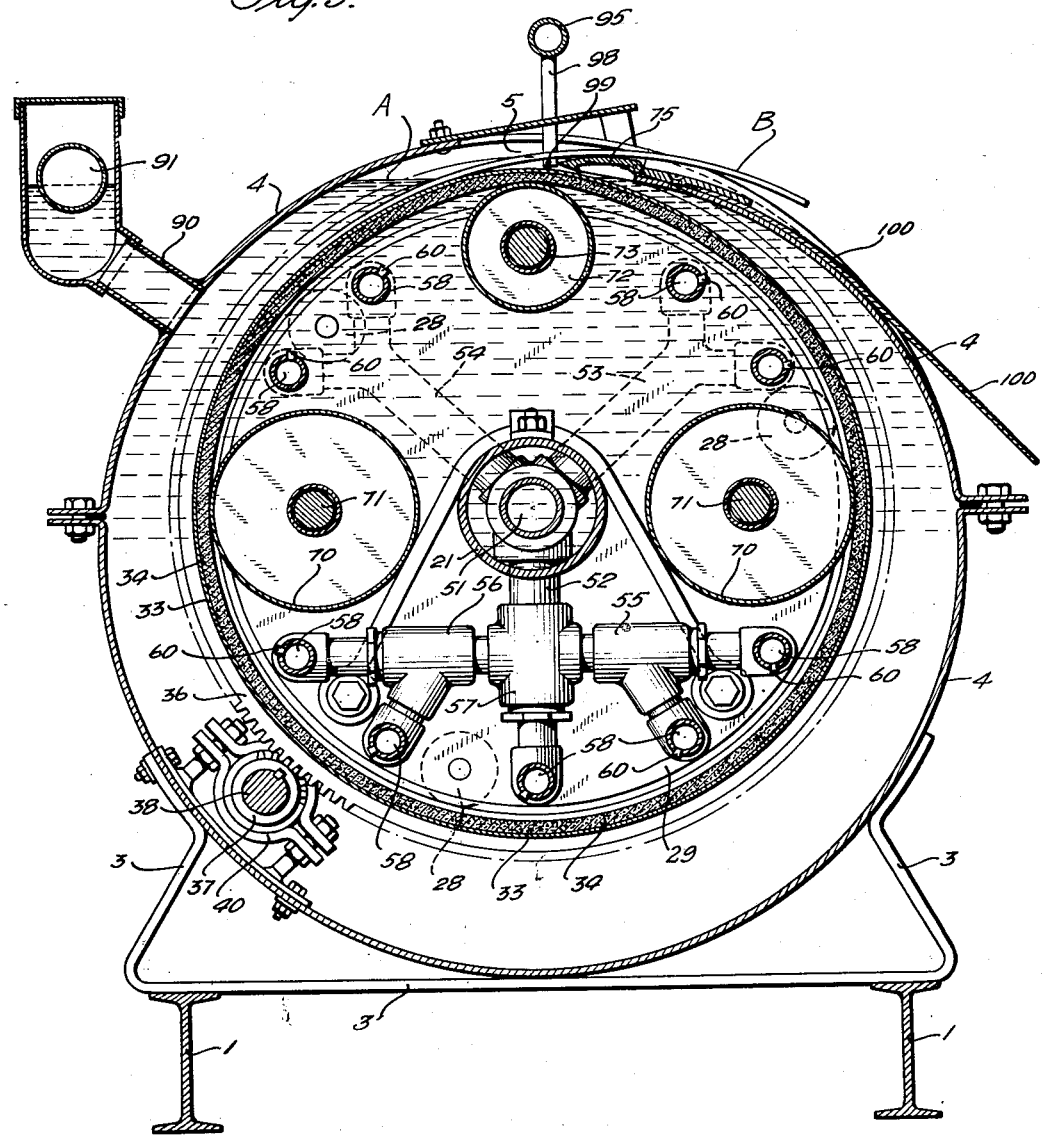
Fig. 5 is an enlarged transverse vertical section taken on the line 5—5 of Fig. 1.

At the bottom of Fig. 4 are shown foundation beams 1, 1 connected by a foundation plate 2, which beams and plate support the entire machine. Secured to the foundation beams 1, 1 are suitably formed brackets 3 to support a cylindrical tank 4, which is adapted to receive and hold the water, and in which the freezing cylinder rotates. Tank 4 is formed of two sections, as shown, to facilitate the installation and removal of the freezing cylinders and associated mechanism. As shown in Fig. 5, the upper section of the tank 4 is provided at the top and intermediate its ends with longitudinal openings 5 to permit the peeled ice to pass out of the tank onto a chute 100 supported by the tank 4 and leading to a storage bin or receptacle (not shown).

Freezing cylinder assembly

Referring to the left hand side of Fig. 3, the front end wall of the tank 4 is provided with a central opening to receive a bored hub 6, which is secured to the end wall of the tank by bolts 7 which pass through a flange 8 of hub 6 and are locked thereto by nuts 9. Interposed between the tank end wall and the flange 8 is a gasket 10 which may be in the form of rubber tubing to prevent leakage of water from the tank.

Hub 6 forms a surrounding bearing for a hollow stub shaft 11 brazed at its inner end to a ring 13 to which is bolted a disc-shaped head 12, which closes one end of and rotatably supports the freezing cylinder hereinafter described. Suitable gaskets are interposed between head 12 and ring 13. Endwise adjustment of head 12 and the tank end is effected by a suitable spacer ring interposed between flange 8 and gasket 10. Ring 13 bears against babbitt 14 interposed between the bearing 6 and the shaft 11. Leakage between the shaft 11 and its bearing is prevented by packing 15 placed in an annular recess in the bearing hub and held by a pack gland 16 adjustably secured to the hub 6 by studs 17.

Shaft 11 is secured to a packing sleeve 18. Interposed between shaft 11 and sleeve 18 is a bushing 19, preferably of impregnated wood to provide a heat insulated bearing surface. The interior surface of bushing 19 rides upon a journal 20 which is fitted closely and secured to a hollow shaft 21 extending centrally and longitudinally of the machine through the tank 4 and freezing cylinder. The hollow shaft 21 is fixed against rotation by torque arms 101 (see Fig. 4) bolted to foundation plate 2 and also to a flange 110 keyed and screwed to shaft 21. Hollow shaft 21 serves as a circulating medium for the brine as hereinafter described.

Leakage between bushing 19 and journal 20 is prevented by packing 105 interposed between sleeve 18 and shaft 21 and held by a pack gland 106 adjustably secured by right and left hand screws 107 to a clamp ring 111 bolted to flange 110. Interposed between flange 110 and ring 111 is a packing 112. Bolted to flange 110 of shaft 21 is an end casting 22 provided with ports for the ingress and egress of the brine. Secured to the inner surface of the shaft 21 and extending beneath the bearings heretofore described, is a sleeve of insulating material 23 to protect the bearings against the action of the brine in the shaft 21.

Turning now to the right hand side of Fig. 3, the back end wall of the tank 4 is also provided with a central opening to receive a bored hub bearing 6a secured to the end wall of the tank by bolts 7a which pass through a flange 8a of hub 6a and are locked thereto by nuts 9a. To prevent leakage there is interposed between the tank end wall and the flange 8a a gasket 10a and a suitable spacer ring. Hub bearing 6a is closed exteriorly of the tank, as shown.

Hub 6a forms a surrounding bearing for a hollow stub shaft 11a brazed at its inner end to a ring 13a to which is bolted a disc-shaped head 12a which closes that end of the freezing cylinder. Suitable gaskets are interposed between head 12a and ring 13a. Endwise adjustment of head 12a and the tank end is effected by the spacer ring which is interposed between flange 8a and gasket 10a. Ring 13a bears against a babbitt 14a interposed between the bearing 6a and the shaft 11a.

Shaft 11a rotates on a journal 20a secured to the shaft 21. Interposed between the shaft 11a and the journal 20a is a bushing 19a preferably of impregnated wood which rotates with the shaft 11a on the journal 20a. Welded or otherwise tightly fastened to the end of the shaft 11a is an end plate 123 to prevent leakage of the brine into the water tank. To the inner face of plate 123 is secured a heat insulating disc 123a.

Cylinder construction

As shown in Figs. 1 and 3, the illustrative cylinder is made in two sections which are secured to and supported by end rings 26 and a center ring 27. End rings 26 are welded respectively to heads 12 and 12a to rotate therewith, and center ring 27 rotates on rollers 28 journaled in center plates 29 supported by the shaft 21. The inner surface of ring 27 is insulated with a rubber strip 30, and bearing against the strip 30 is a track 31 to ride on the rollers 28, the track 31 and strip 30 being secured to the ring 27 by screws 32.

Each section of the cylinder is preferably made up of a plurality of very thin edge-to-edge arranged sheets 33 of a metal having great flexibility and strength, which are secured together by interior circumferential strips 34 of fabric reenforced rubber and longitudinal lock seams and rubber strips (not shown). The outer ends of the cylinder thus formed are provided with other fabric reenforced rubber aprons 35, which are secured to the end and center rings respectively by wire strands wound over the thin ends of the aprons 35 to bind them into circumferential grooves formed in the end and center rings.

The strips 34 and the end aprons 35 are of substantial thickness for the dual purpose of providing heat insulation to prevent formation of the ice beneath the edges of the metal sheets, which would tend to separate the metal from the rubber, and of providing tracks for the cylinder guiding and deflecting rollers presently to be described. For a more detailed description of the flexible freezing cylinder reference is made to a copending application, filed August 14, 1931, Serial No. 557,108, directed particularly to said cylinder and its method of manufacture.

Cylinder driving mechanism

Referring to Figs. 1 and 3, each end ring 26 and center ring 27 carries a gear 36 secured thereto by studs, nuts or screws. Gears 36 are rotated by pinions 37 (see Fig. 5) carried by a jack shaft 38 (see Fig. 3) which extends within and lengthwise of the tank 4 and it journaled at the back end of the machine in bearing 39, centrally of the machine in bearing 40, and at the front end of the machine in jack shaft box 35 and gland 41, said bearing members being secured to the walls of the tank 4, as shown.

Referring to the left hand side of Fig. 3, the end of shaft 38 which extends out of the tank 4 carries a gear 42 which meshes with a pinion 43 carried on a shaft 44 of a reduction gear 45 which is connected by a flexible coupling 46 (see Fig. 4) to a motor 47. The reduction gear and the motor are suitably supported on the foundation plate 2.

The parts thus far described are sufficient for the observation that if the water level in the tank is maintained at the line A in Fig. 5, the ice will be formed from the water contacting with the outer surface of the cylinder below the line A if a cold producing medium such as brine is circulated through the interior of the cylinder. And further, that since the cylinder is capable of rotation upon its own axis the brine may be projected against all points along its interior surface by fixed nozzles if desired. The mechanism for circulating the brine through the cylinder will now be described.

Brine circulating system

Referring to Fig. 4, cold brine under pump pressure enters the machine through a pipe 48 provided with a strainer 49, then through a port 50 (see Fig. 3) in casting 22 into a pipe 51 which extends lengthwise of hollow shaft 21. As shown in Fig. 5, the pipe 51 is provided with openings for the reception of three branch pipes 52, 53 and 54, into which the brine is forced through the pipe 51. Branch 52 is preferably located near the front end of the cylinder and extends downwardly from the pipe 51. Branches 53 and 54 are located near the back end of the cylinder and extend upwardly at an angle to either side of the cylinder. Branch 52 through extensions 55, 56 and 57, carries the brine to five header pipes 58 extending in spaced relationship longitudinally of the cylinder and in close proximity to its inner surface. Pipes 58 are closed at their ends and are supported by end plates 59 (see Fig. 3) secured to shaft 21. Pipes 58 are provided at intervals along their lengths with nozzles 60 through which the brine is projected against the inner surface of the cylinder.

Branches 53 and 54, through extensions, each carry the brine to two header pipes 58, also provided with nozzles 60. Thus the brine which enters pipe 51 is distributed through the branches 52, 53 and 54 to the header pipes 58 and projected through the nozzles 60 against the inner walls of the cylinder at closely spaced points to insure a freezing temperature of the cylinder at all points which are submerged in the water.

Referring to Fig. 3, the brine which has been projected into the freezing cylinder is returned to the brine source of supply in the following manner: Hollow shaft 21 is provided adjacent each head of the cylinder with openings 61. The spent brine enters openings 61 and is drawn through shaft 21 toward the front end of the machine (the left end of Fig. 3). The brine then passes through a port 62 into the exit end of casting 22 and then into a return pipe 63 (see Fig. 4), from which it is drawn through an outlet 64 and suitable piping to a brine cooling apparatus (not shown). Return pipe 63 is open at the top so that the pressure against the cylinder due to the hydrostatic head of the brine may be controlled.

Provision is made to care for the increase or decrease in volume of the brine due to variations in the temperature of the brine. As shown at the top of Fig. 1, a brine storage tank 65 is connected to the brine return pipe 63 above the outlet 64. Tank 65 preferably takes the form of a long horizontal pipe and may be supported by brackets (not shown) from the ceiling of the room or building. Tank 65 functions as a storage space for an excess amount of brine. The arrangement is such that under normal conditions the brine will half fill the tank 65. Should the temperature of the brine be lowered, causing a reduction in the volume of the brine in circulation, a portion of the brine in the storage tank will be drawn into circulation and the level of the brine in the tank will be lowered. Should the temperature of the brine be increased, causing an increase in its volume, the increase will find room in tank 65. The proportions are such that a considerable variation in the volume of the brine may take place without unduly raising or lowering the level of the brine in the storage tank 65.

Referring to Fig. 4, safety valve connections are interposed between the inlet brine pipe 48 and the outlet brine pipe 63 to care for any excess brine pressure which might be developed. As there shown, pipe 48 is connected to pipe 63 by a pipe 120 having by-pass pipes 121 and 122 connected thereto. Pipe 120 is provided with a check valve 67 and pipe 122 is provided with a three-way cock 123 normally turned to prevent passage of brine from inlet pipe 48 to outlet pipe 63. Pipe 121 carries a safety valve 66 adapted to open under excess pressure and permit the brine to flow from the inlet pipe 48 directly into the outlet pipe 63 through pipe 121.

Check valve 67 is adapted to interrupt any back syphoning of the brine through inlet pipe 48 by admitting air into pipes 120 and 48 when the level of the brine in outlet pipe 63 falls below the open end of pipe 120.

Connected to pipe 122 by a pipe 125 is a brine pressure gage 124.

*Mechanism for guiding and deflecting the freezing cylinder to form ice thereon and peel it therefrom*

It is clear from the foregoing description that the cylinder rotates past jets of cold brine issuing from the nozzles 60, which causes a continuous layer of ice to form on the metal sheets of the cylinder as they move through the water in the tank 4. This ice formation clings to the cylinder with great tenacity so long as the cylinder retains its normal shape, but is readily removed if the cylinder is deflected sufficiently from its normal shape. Because the ice will peel from the cylinder at any point of deflection of the cylinder, and because it is desirable to peel the ice only at the top of the cylinder where it projects above the water level in the tank, provision is made to maintain substantially the normal shape of the cylinder below the water level and to deflect that portion of the cylinder which extends above the water level. The deflecting mechanism is also designed to remain in constant deflecting position at the top of the cylinder so that as the cylinder rotates, substantially a continuous peeling of ice from the cylinder will occur at that point and the ice will be peeled off in long strips or ribbons and pass onto a chute 100 for delivery to a storage bin. The cylinder guiding and deflecting mechanism in its illustrated embodiment will now be described.

As shown in Fig. 5, two large cylindrical guide rollers 70 are provided for each half section of the cylinder, one on each side of central shaft 21 and equidistant therefrom. Rollers 70 are located to contact with the interior rubber strips 34 of the cylinder and maintain a normal curvature of the cylinder at the point of contact. Additional rollers 70 may be provided but it has been found in practice that two large rollers located as shown in Fig. 5 are sufficient to guide the rotating cylinder and prevent any deflection which would cause the ice to cross-crack or peel in the water. The rollers 70 rotate on shafts 71 journaled in suitable bearings carried respectively by end plates 59 and central plates 29 (see Fig. 3) which are supported on shaft 21.

Still referring to Fig. 3, a deflecting roller 72 is located in each half section of the cylinder at the top of the cylinder at a distance from central shaft 21 sufficiently great to raise and deflect the cylinder at that point, i. e., the point of contact between the rollers 72 and the strips 34 of the cylinder is a greater distance from the axis of rotation of the cylinder than are the points of contact between the rollers 70 and the strips 34 of the cylinder. Rollers 72 rotate on shafts 73 journaled in suitable bearings carried respectively by end plates 59 and central plates 29 supported by the shaft 21. Deflecting rollers 72 are considerably smaller in diameter than guide rollers 70, for the purpose of increasing the deflecting curvature of the cylinder at the point of contact with the smaller rollers 72. Thus, as clearly shown in Fig. 5, the ice designated B which has been frozen in the form of the normal curvature of the cylinder, cannot follow the deformed curvature of the cylinder adjacent the roller 72 and will peel off at that point as the cylinder rotates.

To assist in peeling and guiding the ice from the cylinder, a curved plate 75 having a pointed edge may be secured to the wall of tank 4 adjacent the opening 5 so that the sheet of peeled ice may ride out upon and over the plate onto the chute 100. Plate 75 is preferably pivoted to the wall of tank 4 and provision is made for adjusting its elevation.

Heat insulation for heads of cylinders

In the operation of the machine there is a tendency for ice to form on the outer faces of the cylinder heads 12 and 12a and this ice might eventually build up until it filled the spaces between the rotary heads and adjacent stationary parts. Further, there is a tendency for ice to form upon the end aprons 35 on account of the small amount of flexing imparted to the aprons adjacent their fixed lines of attachment. Formation of ice over the ends of the aprons would still further decrease their permissible flexing and impair the efficiency of the machine. Means is herein provided for avoiding these difficulties so as to keep the machine in proper operating condition for any length of time it may be used.

In Fig. 3, each cylinder head is seen to be equipped on its inner face and beneath the end apron with a plurality of discs 78 of heat insulating material, such as a prepared wood fibre. The discs may be held in position by a shield 79 and suitable screws entering threaded holes in the head. Such insulation prevents the formation of ice on the cylinder heads and the ends of aprons 35.

Air vent and brine drainage for cylinder

Mechanism is provided to permit the escape of air from the freezing cylinder when the brine is initially run into the cylinder preparatory to starting the machine and when the cylinder is drained of brine after a run. A drain for the brine is also provided. Such mechanisms are best shown in Figs. 4, 6 and 7.

Figure 6:
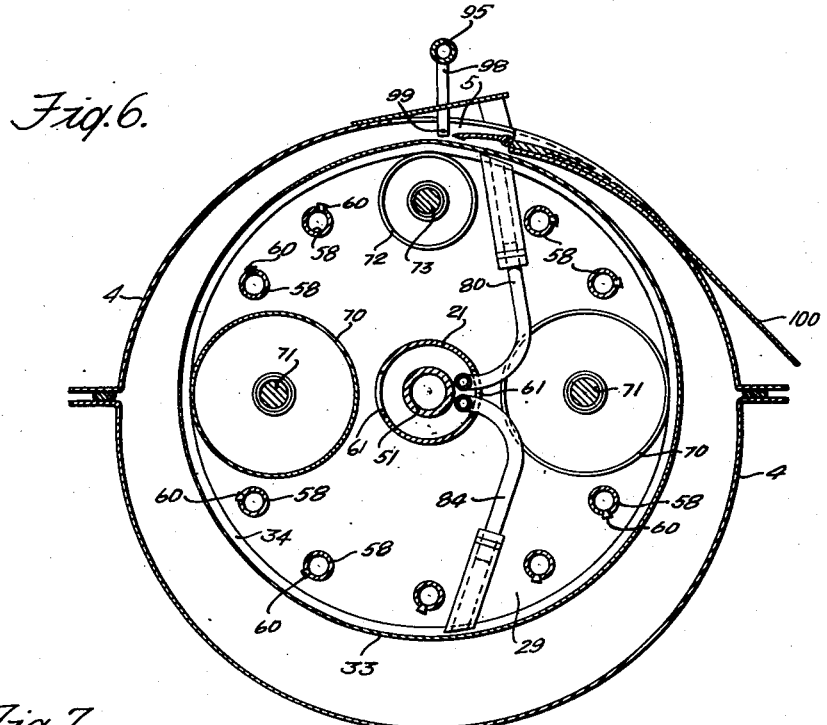
Fig. 6 is a transverse vertical section taken on the line 6—6 of Fig. 3; certain parts being omitted for clearness of illustration.
Figure 7:
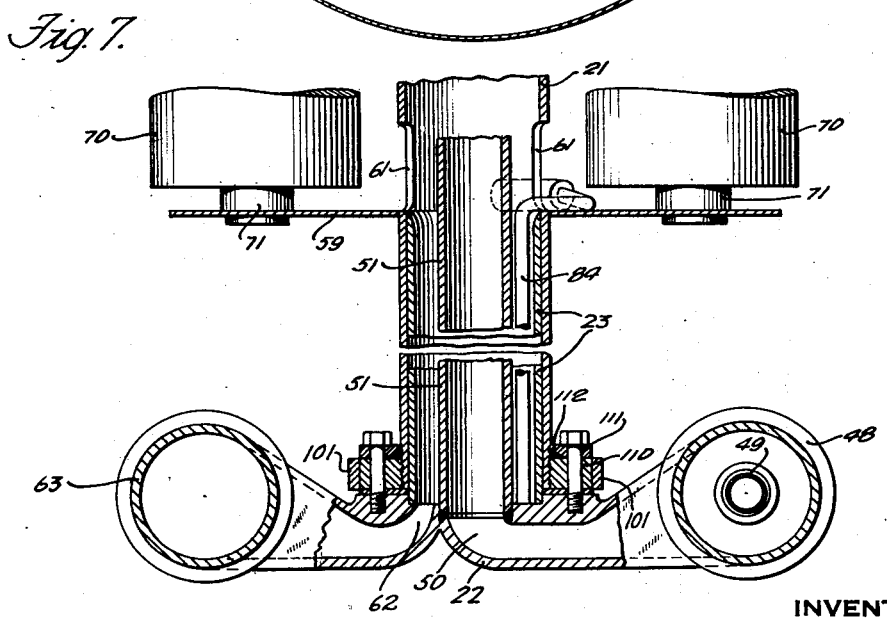
Fig. 7 is a horizontal section taken on the line 7—7 of Fig. 4.

Referring to Fig. 6, an air vent tube 80 is provided having an opening near the upper inner surface of the cylinder. Tube 80 passes into hollow shaft 21 through one of the openings 61, thence through the shaft 21 to the front end of the machine where the tube 80 (see Fig. 4) is connected to a valve 81 by a nipple 82. The valve 81 may be opened or closed by a hand wheel 83.

A brine drainage tube 84 is provided having an opening near the lower inner surface of the cylinder. Tube 84 passes into hollow shaft 21 through one of the openings 61, thence through the shaft 21 to the front end of the machine, where tube 84 (see Fig. 4) is connected to a valve 85 by a nipple 86. Valve 85 may be opened or closed by hand wheel 87.

In normal operation of the machine, valves 81 and 85 are both closed. To drain the brine from the cylinder both valves are opened. If there is no brine in the cylinder when the machine is started, air vent valve 81 is opened until the normal amount of brine has entered the cylinder, then valve 81 is closed.

Water regulation

Since the level of the water in the tank 4 is to be maintained below the top of the freezing cylinder, and since the body of water in the tank is constantly being used up in the formation of ice which is removed, it is necessary to replenish the water supply and it is desirable that the additional water be added gradually and constantly so that the water level in the tank may remain substantially the same at all times.

As shown particularly in Figs. 4 and 5, water is supplied at one side of the tank by an inlet pipe 97 controlled by a float 91 and a control valve 94, a well being provided for the float if desired to protect it. Water is fed from a source of supply to the inlet pipe 90 through a pipe 93.

At another point near the top of the tank an overflow pipe (not shown) may be located to insure the maintenance of the water level below the top of the freezing cylinder. At the bottom of the tank a drain cock 92 is provided to remove all the water from the tank when desired.

Water spray for peeled ice

As shown in Fig. 5, the strip of ice B peels from the freezing cylinder above the water level A. The under surface of the ice so peeled which has been in contact with the freezing cylinder is colder than the upper surface of the ice which has been in contact with the water in the tank. Thus the temperature of the under surface of the peeled ice is considerably below 32° F., while that of the upper surface is only slightly below the freezing point. As heretofore pointed out, ice thus peeled in the air is drier and colder than ice which has been peeled in the water and warmed by the water to a temperature slightly below freezing, and such dry, cold ice has many advantages for some purposes. However, for other purposes a wet and less cold ice is desirable. Provision is therefore made to spray the under side of the peeled ice with water as it is peeled from the freezing cylinder to produce, when desired, the same character of ice as would be produced by peeling the ice while submerged in the water of the tank.

Among other results which I obtain by thus spraying water on the ice is the effect on the ice itself, for by spraying water on the strips or ribbons of ice, as above described, the translucent characteristics of the ice are changed. For example, the spray tends to change an opaque strip of ice into a transparent strip, the tendency to change always being present, but the degree of change depending upon the conditions surrounding the operation. Among the various advantages of such a cleared ice is the advantage of a clear ice over an opaque ice for display purposes. I am able to supply a clear ice for those purposes demanding such a product.

Another result which I obtain by thus spraying water on the under surface of the ice peeled from the cylinder is that the sprayed liquid freezes on the under side of the ice, and thereby increases the thickness of the ice and the efficiency of the operation.

Figure 8:
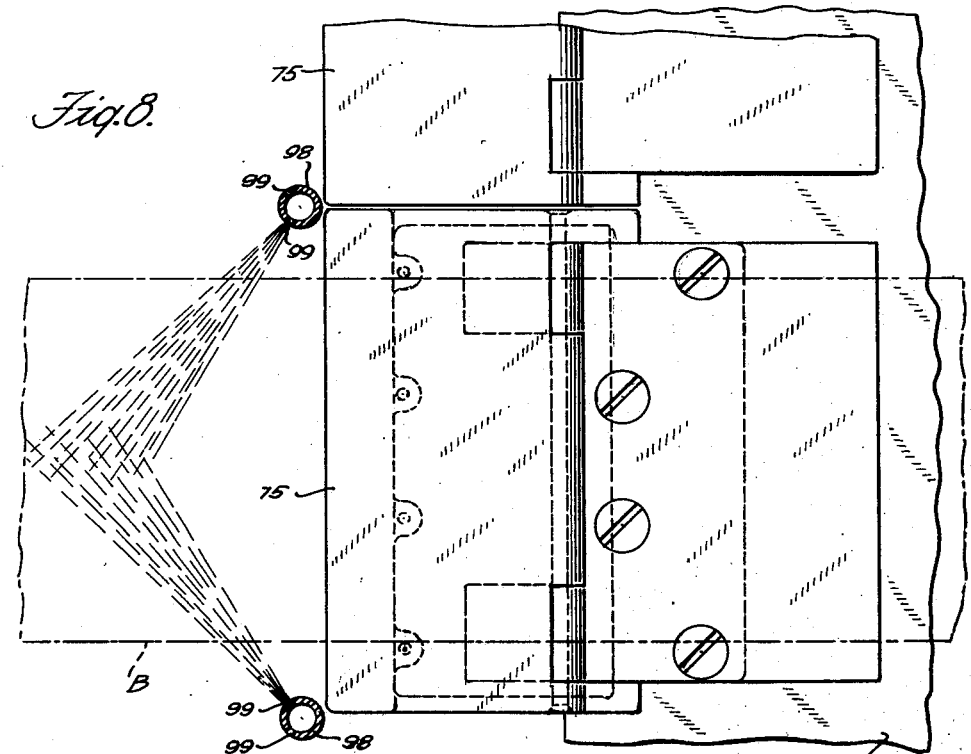
Fig. 8 is an enlarged top plan view of a portion of the machine showing the spraying and peeling of a strip of ice.
Figure 9:
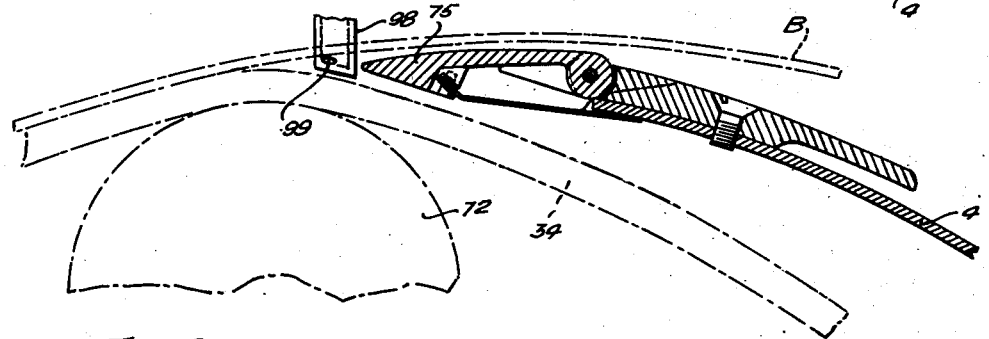
Fig. 9 is a vertical section of the same.

Referring to Fig. 4, a pipe 95 extends lengthwise the tank 4 above the point where the ice is peeled from the freezing cylinder. Water is supplied to pipe 95 from source supply pipe 93 through a connecting pipe 96. The flow of water through the pipe 96 is controlled by a valve 97. Extending downwardly from the pipe 95 and between each sheet of peeled ice is a spray pipe 98 provided with orifices 99 formed and directed to spray water upwardly against the under side of the peeled ice, as clearly shown in Fig. 8. A portion of the water sprayed on the under side of the cold ice freezes thereon and adds to the thickness of the ice. Thus it will be seen that when valve 97 is opened, the water will flow from source supply pipe 93 through pipe 96 into pipe 95 and down through pipes 98 and out through orifices 99 against the under side of the peeled ice. When a dry cold ice is desired valve is closed. When a wet, warmer ice is desired, valve 97 is left open during the operation of the machine.

It should be noted at this point that while provision is made for producing either dry or wet ice, both forms of ice are peeled from the cylinder above the level of the water in the tank and pass directly from the cylinder onto a chute which delivers the ice to a suitable receptacle or storage bin; also that the thickness of the peeled ice may be controlled by the speed of rotation of the cylinder, or by the coldness of the brine, or by the rapidity of flow of the brine.

It should be noted further that the comparatively large diameters of the guide rollers 10 assist materially in maintaining the normal curvature of the freezing cylinder below the water level and thus reduce cross-cracking of the ice while it is being frozen.

The operation of the machine will be apparent from the foregoing description without further amplification. The machine in operation will make ice much more rapidly and efficiently than is possible with the usual types of ice making machines. Either dry or wet ice may be produced in long strips or ribbons which are delivered directly from the cylinder to a suitable receptacle or storage bin. As the peeled ice leaves the freezing cylinder and is projected onto the chute it breaks off at intervals, either because of its own weight or by the end of the sheet coming in contact with the chute.

While one specific embodiment of the invention has been described with particularity it is to be understood that the invention is not meant to be limited thereby, but may have numerous other embodiments within the scope of the appended claims. And while the machine selected for illustration is designed primarily for the freezing of water, it will be understood that it may be used to freeze other liquid or semi-liquid substances.

I claim:

1. Apparatus of the character described comprising, in combination, a tank for liquid to be frozen, a flexible freezing cylinder having a cylinder wall partially submerged in the liquid in the tank, means to rotate the cylinder, rollers contacting with the inner face of the cylinder wall below the liquid level to guide the cylinder in its rotation and maintain substantially constant the curvature of the cylinder below the liquid level, and a roller contacting with the inner face of the cylinder wall above the liquid level to deflect the cylinder wall as it rotates above the liquid level, the latter roller having a diameter substantially less than that of the other rollers.

2. Apparatus of the character described comprising, in combination, a tank for liquid to be frozen, a flexible freezing cylinder having a cylinder wall partially submerged in the liquid in the tank, means to rotate the cylinder, rollers contacting with the inner face of the cylinder wall below the liquid level to guide the cylinder in its rotation and maintain substantially constant the curvature of the cylinder below the liquid level, and a roller contacting with the inner face of the cylinder wall above the liquid level and adapted to deflect the cylinder wall as it rotates above the liquid level.

3. Apparatus of the character described comprising, in combination, a tank for liquid to be frozen, a flexible cylinder having a cylinder wall partially submerged in the liquid in the tank, means to rotate the cylinder, means to maintain substantially constant the curvature of the cylinder wall as it rotates below the liquid level, and means to deform the curvature of the cylinder wall as it rotates above the liquid level.

4. Apparatus of the character described comprising, in combination, a tank for liquid to be frozen, a flexible freezing cylinder having a cylinder wall partially submerged in the liquid in the tank, means to rotate the cylinder, and cylinder deflecting means constructed and arranged to deflect the rotating cylinder to cause substantially a continuous peeling of the frozen liquid above the liquid level in the tank without causing any peeling below the liquid level.

5. Apparatus of the character described comprising, in combination, a tank for liquid to be frozen, a flexible freezing cylinder partially submerged in the liquid in the tank, means to rotate the cylinder, and cylinder deflecting means constructed and arranged to cause the frozen liquid to peel in a continuous strip from the cylinder above the liquid level in the tank.

6. Apparatus of the character described comprising, in combination, a tank for the liquid to be frozen, a flexible freezing cylinder partially submerged in the liquid in the tank, means to rotate the cylinder, and means constantly deflecting the rotating cylinder along a line above the liquid level in the tank to cause the liquid which has frozen on the cylinder to peel therefrom at said line without deflecting the cylinder below the liquid level.

7. Apparatus of the character described comprising, in combination, a tank for liquid to be frozen, a flexible freezing cylinder partially submerged in the liquid in the tank, means to circulate brine against the inner face of the cylinder wall, means to rotate the cylinder, means to maintain substantially a constant curvature of the cylinder below the liquid level, and means to change the curvature of the cylinder above the liquid level.

8. Apparatus of the character described comprising, in combination, a tank for water to be frozen, a rotatable flexible freezing cylinder partially submerged in the water in the tank, means to deflect the cylinder as it rotates above the water level in the tank to cause the ice to peel therefrom above the water level, and means to spray water on the ice as it peels from the cylinder.

9. Apparatus of the character described comprising, in combination, a tank for water to be frozen, a rotatable flexible freezing cylinder partially submerged in the water in the tank, means to deflect the cylinder above the water level in the tank to cause the ice, upon rotation of the cylinder, to peel therefrom above the water level, and means to spray water on the under surface of the ice as it peels from the cylinder.

10. Apparatus of the character described comprising, in combination, a flexible freezing cylinder, means to rotate the cylinder, means for applying a liquid to the rotating cylinder at selected points about its periphery, means to maintain substantially constant the curvature of the cylinder at the points where the liquid is applied, and means to deflect the cylinder as it rotates at a point removed from the selected points to cause the frozen liquid on the cylinder to peel therefrom at said latter point and be delivered thereby to a chute or receptacle.

11. The method of manufacturing a frozen liquid which consists in partially submerging a flexible cylinder in liquid to be frozen, projecting a refrigerant upon that portion of the wall of the cylinder in contact with the liquid; rotating the cylinder, maintaining substantially a constant arc of curvature below the liquid level, and changing the arc of curvature at a point above the liquid level to cause the liquid frozen on the cylinder below the liquid level to peel from the cylinder above the liquid level.

12. The method of making a frozen liquid which consists in freezing the liquid on a flexible sheet while the sheet is submerged in the liquid, removing the sheet and the liquid frozen thereon from the body of the liquid, further cooling the frozen liquid on the sheet to a temperature below the freezing point, deflecting the sheet to remove the frozen liquid therefrom, and spraying liquid on the side of the frozen liquid adjacent the flexible sheet.

13. Apparatus of the character described comprising, in combination, a flexible freezing cylinder rotatable about a horizontal axis, means to rotate the cylinder, means for applying a liquid to the rotating cylinder below the top thereof, and means to deflect the cylinder at the top thereof without appreciably deflecting the cylinder below the top thereof to cause the frozen liquid on the cylinder to peel therefrom near the top thereof.

14. Apparatus of the character described comprising, in combination, a flexible freezing cylinder, means to rotate the cylinder, means to deflect the rotating cylinder at a selected fixed point relative to its axis of rotation, means for applying a liquid to the rotating cylinder at another point remote from the point of deflection in the direction of travel of the cylinder and means to maintain a constant arc of curvature of said cylinder from the point of application of the said liquid to the point of deflection, whereby the liquid freezes on the cylinder during its travel from the point of application of the liquid to the point of deflection of the cylinder and the frozen liquid is peeled from the cylinder at said latter point.

15. Apparatus of the character described comprising, in combination, a tank for the liquid to be frozen, an endless flexible deformable freezing surface partially submerged in the liquid in the tank, means for withdrawing heat from that portion of said freezing surface in contact with said liquid to be frozen, means to maintain a predetermined curvature of said freezing surface below said liquid level, and means to change said curvature above the liquid level to cause the liquid frozen on the outside of said surface to peel therefrom.

16. Apparatus of the character described comprising, in combination, a tank for the liquid to be frozen, a flexible cylinder partially submerged in the liquid in the tank, means to rotate the cylinder, means to maintain substantially the normal curvature of the cylinder below the liquid level, and means to deform the curvature of the cylinder above the liquid level to cause the liquid frozen thereon to peel therefrom in a continuous strip; and means for conducting the peeled strips from the cylinder including a chute a portion of which has a curvature of slightly greater radius than that of the peeled strips.

17. Apparatus of the character described comprising, in combination, a tank for the liquid to be frozen, a rotatable flexible freezing cylinder at least partially submerged in the liquid in the tank, a refrigerant such as brine in said cylinder, means to circulate the brine against the inner face of the cylinder wall and in the direction of rotation of said cylinder, said means including submerged jets arranged in spaced peripheral areas around the interior of said cylinder and directed at an angle against the inner face of the cylinder wall and in the direction of rotation of the cylinder; means to maintain substantially the normal curvature of the cylinder over a greater portion of the periphery thereof, and means to deform the cylinder wall over the remaining portion of the periphery.

18. Apparatus of the character described including, in combination, a tank for the liquid to be frozen, a flexible cylinder partially submerged in the liquid in the tank, means to rotate the cylinder, means to maintain substantially the normal curvature of the cylinder below the liquid level, means to deform the curvature of the cylinder above the liquid level to cause the liquid frozen thereon to peel therefrom in a continuous strip; and means including a curved plate having a generally tapered edge mounted above said cylinder near the area of deflection, the edge of said plate opposite said tapered edge being hingedly connected to the wall of said tank, and a spring for resiliently holding the tapered edge of said plate above and out of contact with said cylinder and in a position to guide the peeled ice from said cylinder.

19. The method of manufacturing a frozen liquid product comprising, freezing the liquid on a flexible surface while the surface is submerged in the liquid to be frozen, lowering the temperature of the liquid frozen on the surface to a temperature materially below the melting point of the liquid, removing the flexible sheet and the liquid frozen thereon from the body of the liquid, deflecting the sheet to remove the frozen liquid therefrom without materially raising the temperature of the frozen liquid, and spraying liquid on the side of the frozen liquid adjacent the flexible sheet.

20. The method of manufacturing a relatively clear ice which consists in, supplying water to a freezing surface to freeze a thin sheet of ice thereon, deflecting said freezing surface above the level of the supplied water to remove the ice therefrom, and thereafter spraying relatively warm liquid on that side of the ice which was in contact with the freezing surface to clarify said ice.

21. The method of manufacturing a relatively clear ice which consists in, partially submerging a freezing surface in a liquid to be frozen, freezing a portion of said liquid on said freezing surface, removing said freezing surface from the remaining liquid, removing the frozen liquid therefrom, and thereafter supplying a spray of relatively warm liquid to said frozen liquid to clarify the same.

22. Apparatus for manufacturing ice comprising, in combination, an endless flexible freezing surface, means for giving said surface a pear-shaped cross-section, and means for causing relative movement between said shaping means and said surface to cause the peak of said pear-shape to travel around said surface, and means for supplying water to be frozen to said surface.

23. Apparatus for manufacturing ice comprising a flexible freezing cylinder having a freezing surface, means for so shaping said cylinder as to give its cross-section a pear-shaped contour, means for causing the peak of the pear-shape to shift around the periphery of said cylinder, and means for supplying water to be frozen to that portion of the surface removed from said peak.

24. In apparatus of the character described, in combination, a flexible rotatable cylinder horizontally mounted, supporting means running through said cylinder and supported exteriorly of said cylinder, radially spaced rollers in said cylinder supported by said supporting means and spaced equidistant from the axis of said cylinder, rigid means mounted on the inside of said cylinder and adapted to roll on said rollers, a gear mounted on the exterior of said cylinder concentric with said rigid means, and means for driving said gear to rotate said cylinder.

25. In apparatus of the character described, in combination, a flexible rotatable cylinder, supporting means running through said cylinder and supported exteriorly of said cylinder, radially spaced rollers supported by said supporting means and spaced equidistant from the axis of said cylinder, rigid means mounted on said cylinder and adapted to roll on said rollers, heads for closing the ends of said cylinder rotatably mounted on said supporting means, a plurality of gears mounted around the exterior of said cylinder respectively substantially concentric with said heads and said rigid means, and means for synchronously driving said gears to rotate said cylinder.

26. In apparatus of the character described, in combination, a flexible rotatable cylinder, supporting means running through said cylinder and supported exteriorly of said cylinder, radially spaced rollers mounted in said cylinder and supported by said supporting means and spaced equidistant from the axis of said cylinder, rigid means mounted on said cylinder and adapted to roll on said rollers, heads for closing the ends of said cylinder rotatably mounted on said supporting means, gears mounted around the exterior of said cylinder respectively substantially concentric with said heads and said rigid means, and means for synchronously driving said gears to rotate said cylinder comprising a single driven shaft and pinions on said shaft for driving said respective gears.

27. Apparatus of the character described comprising, in combination, a flexible rotatable cylinder, means for rotating said cylinder, means for supplying water to be frozen to said cylinder, means for flexing said cylinder across its length to cause the ice to peel therefrom, means including a curved plate having a generally tapered edge hingedly mounted adjacent said cylinder near the line of deflection, and means for resiliently holding the tapered edge of said plate slightly spaced from said cylinder and permitting free movement of said edge away from said cylinder in the event of ice collecting thereon.

28. Apparatus of the character described comprising in combination a flexible curved fluid congealing surface, means for supplying said congealing surface with fluid to be frozen, means for relatively moving said congealing surface and said fluid-supplying means, means for progressively flexing said congealing surface following the fluid-supplying operation, and means for maintaining the curvature of said flexible congealing surface without reversal during the fluid-supplying and flexing operations.

CROSBY FIELD.